(12) United States Patent
Meimberg et al.

(10) Patent No.: US 11,415,442 B2
(45) Date of Patent: Aug. 16, 2022

(54) ULTRASONIC FLOW TUBE HAVING A PLURALITY OF OUTER PIPES SURROUNDING A CENTER PIPE POSITIONED BETWEEN AN INLET WALL AND AN OUTLET WALL HAVING TRANSDUCERS THEREIN

(71) Applicant: Honeywell International Inc., Morris Plains, NJ (US)

(72) Inventors: Tobias Meimberg, Osnabrueck (DE); Norbert Flerlage, Loeningen (DE); Christian Lampe-Juergens, Spelle (DE); Ralf Schroeder genannt Berghegger, Glandorf (DE); Andreas Wuchrer, Georgsmarienhuette (DE)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 97 days.

(21) Appl. No.: 16/949,471

(22) Filed: Oct. 30, 2020

(65) Prior Publication Data
US 2022/0136879 A1    May 5, 2022

(51) Int. Cl.
  *G01F 1/66* (2022.01)
  *G01F 1/667* (2022.01)
(52) U.S. Cl.
  CPC .............. *G01F 1/662* (2013.01); *G01F 1/667* (2013.01)
(58) Field of Classification Search
  None
  See application file for complete search history.

(56) References Cited

U.S. PATENT DOCUMENTS

| | | | | |
|---|---|---|---|---|
| 4,365,518 A * | 12/1982 | Zacharias, Jr. | ........... | G01F 1/66 73/861.31 |
| 4,523,478 A * | 6/1985 | Zacharias, Jr. | ......... | G01F 1/662 73/861.28 |
| 5,243,863 A * | 9/1993 | Gill | ......................... | G01F 1/662 73/861.28 |
| 5,777,237 A * | 7/1998 | Collier | .................... | G01F 1/662 73/861.27 |

(Continued)

FOREIGN PATENT DOCUMENTS

| | | |
|---|---|---|
| CN | 102322907 A | 1/2012 |
| CN | 204854843 U | 12/2015 |

(Continued)

*Primary Examiner* — Harshad R Patel
(74) *Attorney, Agent, or Firm* — John Maldjian; Stevens & Lee PC

(57) ABSTRACT

Disclosed is an ultrasonic flow tube comprising: a flow chamber for accepting an inflow of a gas, comprising a center pipe and a plurality of outer pipes surrounding the center pipe, connected between an inlet wall and an outlet wall of the flow chamber such that a velocity of the gas within the center pipe and the plurality of outer pipes is numerically same; and a first transducer attached near the inlet wall and a second transducer attached near the outlet wall, wherein a first acoustic wave package generated by the first transducer and a second acoustic wave package generated by the second transducer is transmitted into the flow chamber such that the center pipe receives a majority of the first and the second acoustic wave package, and the plurality of outer pipes receives a minority of the first acoustic wave package and the second acoustic wave package.

19 Claims, 7 Drawing Sheets

(56) References Cited

U.S. PATENT DOCUMENTS

| | | | |
|---|---|---|---|
| 6,186,179 B1 * | 2/2001 | Hill | G01F 15/00 138/44 |
| 6,338,277 B1 * | 1/2002 | Diston | G01F 1/662 73/861.27 |
| 7,600,417 B2 | 10/2009 | Paradise | |
| 8,689,638 B2 | 4/2014 | Shen | |
| 9,222,811 B2 | 12/2015 | Sonnenberg | |
| 10,101,186 B2 | 10/2018 | Pretre | |
| 10,184,816 B2 | 1/2019 | Sugiyama et al. | |
| 2016/0369624 A1 * | 12/2016 | Ahmad | G01N 29/14 |
| 2019/0154483 A1 | 5/2019 | Hoheisel | |

FOREIGN PATENT DOCUMENTS

| | | |
|---|---|---|
| CN | 106979808 A | 7/2017 |
| EP | 0790490 B1 | 8/1997 |
| EP | 3021117 A1 | 5/2016 |
| JP | 2019196905 A | 11/2019 |

* cited by examiner

ULTRASONIC FLOW TUBE HAVING A PLURALITY OF OUTER PIPES SURROUNDING A CENTER PIPE POSITIONED BETWEEN AN INLET WALL AND AN OUTLET WALL HAVING TRANSDUCERS THEREIN

BACKGROUND

The present disclosure pertains to a flow tube for measuring a flow rate of a gas or any other fluid to be used in meters such as gas meters, water meters, and so forth.

DESCRIPTION OF RELATED ART

Ultrasonic flow meters are commonly used to measure a flow rate of a gas and/or a fluid by using acoustic waves. Conventionally used ultrasonic flow meters alternately transmits and receives a burst of acoustic waves between two transducers. Further, a flow rate within the ultrasonic flow meter is determined by measuring an upstream and downstream time of flight of the acoustic waves travelled between the two transducers in both directions. In addition, a velocity profile through a flow tube of the ultrasonic flow meter should ideally be constant to accurately measure the flow rate, which is difficult to achieve in the conventional flow tubes used in the ultrasonic flow meters.

Conventionally, ultrasonic flow meters are available having flow channels with different diameters that results in a dependency of a flow rate calculation used during a measurement. Moreover, turbulences and pressure losses are also evident due to reflections of the acoustic waves from walls of the flow meters, which causes a generation of different frequency modes.

There is thus a need for an efficient flow tube for the ultrasonic flow meters having reduced reflections and accurate flow rate measurement.

SUMMARY

The disclosure reveals an ultrasonic flow tube comprising: a flow chamber for accepting an inflow of a gas, wherein the flow chamber comprises a center pipe and a plurality of outer pipes surrounding the center pipe, connected between an inlet wall provided at a first end of the flow chamber and an outlet wall provided at a second end of the flow chamber such that a velocity of the gas within the center pipe and each of the plurality of outer pipes is numerically same. Further, the ultrasonic flow tube comprises. a first transducer attached near the inlet wall and a second transducer attached near the outlet wall, wherein a first acoustic wave package generated by the first transducer and a second acoustic wave package generated by the second transducer is transmitted into the flow chamber such that the center pipe receives a majority of the first acoustic wave package and the second acoustic wave package, and each of the plurality of outer pipes receives a minority of the first acoustic wave package and the second acoustic wave package.

The disclosure reveals an ultrasonic flow tube comprising: one or more flow inlets to enable a smooth inflow of a gas inside the ultrasonic flow tube, wherein each of the one or more flow inlets is having a funnel shape. Further, the ultrasonic flow tube comprises, a flow chamber for accepting the inflow of the gas, wherein the flow chamber comprises a center pipe and a plurality of outer pipes surrounding the center pipe, connected between an inlet wall provided at a first end of the flow chamber and an outlet wall provided at a second end of the flow chamber such that a velocity of the gas within the center pipe and each of the plurality of outer pipes is numerically same. Further, the ultrasonic flow tube comprises, a first transducer attached near the inlet wall and a second transducer attached near the outlet wall, wherein a first acoustic wave package generated by the first transducer and a second acoustic wave package generated by the second transducer are transmitted into the flow chamber at a narrow beam angle such that the center pipe receives a majority of the first acoustic wave package and the second acoustic wave package, and each of the plurality of outer pipes receives a minority of the first acoustic wave package and the second acoustic wave package.

The disclosure reveals a method for measuring a total flow rate using an ultrasonic flow tube, the method comprising steps of: allowing a smooth inflow of a gas into a flow chamber of the ultrasonic flow tube through one or more of funnel shaped flow inlets; transmitting a first acoustic wave package using a first transducer, directed towards a center pipe of the flow chamber surrounded by a plurality of outer pipes such that the first acoustic wave package is directed at a narrow beam angle; receiving the first acoustic wave package from the center pipe of the flow chamber at a second transducer; transmitting a second acoustic wave package using the second transducer, directed towards the center pipe of the flow chamber at a narrow beam angle; receiving the second acoustic wave package from the center pipe of the flow chamber at the first transducer; determining an upstream time of flight of propagation of the first acoustic wave package from the first transducer to the second transducer, and a downstream time of flight of propagation of the second acoustic wave package from the second transducer to the first transducer; calculating a flow rate of the gas inside the center pipe of the flow chamber based on the determined upstream time of flight, the determined downstream time of flight and the delta time of flight between both; and calculating a total flow rate by interpolating the calculated flow rate of the center pipe according to a numerical value calculated by summing a number of the centre pipe and a number of the outer pipes surrounding the centre pipe.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

DESCRIPTION

This description may provide one or more illustrative and specific examples or ways of implementing the present system and approach. There may be numerous other examples or ways of implementing the system and approach.

The present approach may provide a flow tube for accurately measuring a flow rate of a gas and/or any other fluid by reducing unwanted reflections, turbulences, and pressure loss.

This present mechanism has a feature in it that it may use the advantages of the prior used flow tube designs without harvesting the disadvantage.

A technical benefit is to have a flow tube that requires only a small interpolation across flowrates, temperature, and gases. In addition to that a velocity interpolation from an inner pipe to an outer pipe enables a small raw error such that an uncorrected error curve has small initial errors.

Further, the disclosed flow tube has reduced reflections that leads to a robust system with less errors. Furthermore, the disclosed flow tube has less turbulences that lead to a smaller standard deviation of the flowrate and a smooth measurement.

A business advantage is to have a flow tube in which a velocity of a gas can be mainly measured in a centre pipe and further interpolate the velocity in a plurality of outer pipes. Further, the interpolation of the velocity works across the complete flow range from 7-12000 l/h and enables a small slope in the error curve.

The present mechanism for measuring a flow rate of a gas by reducing a reflection by using very thin walls made up of a material having a high acoustic impedance. Firstly, the reflection gets absorbed at an entry to small absorbing structures. Next, the reflection gets absorbed by the thin walls made up of a material having a high acoustic impedance, which "clean-up" in the middle of a flow channel. In addition, inlets are shaped as a funnel, a transducer having a slight angled wall, and a dome at an outlet is designed in a way to reduce turbulences and pressure loss.

Figure 1A:
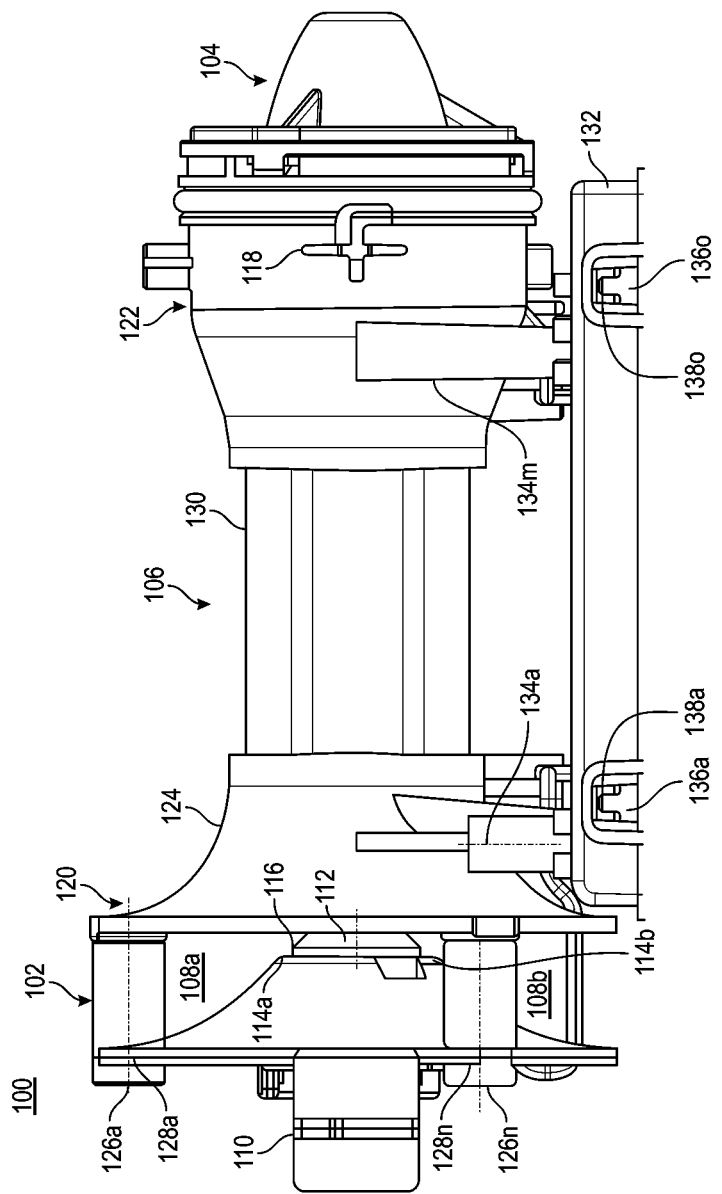
FIG. 1A is a diagram illustrating a flow tube to be connected within an ultrasonic gas meter.

FIG. 1A is a diagram illustrating a flow tube 100. The flow tube 100 may be connected to an ultrasonic gas meter (not shown) and/or an ultrasonic fluid meter for measuring a velocity of a gas and/or a fluid with ultrasound to calculate a flow rate. The flow tube 100 may comprise an inlet portion 102, a rear housing 104, and a flow chamber 106. Further, the inlet portion 102, the rear housing 104, and the flow chamber 106 may be made up of a Polybutylene Terephthalate (PBT) material. The inlet portion 102, the rear housing 104, and the flow chamber 106 may be made up of any of the material known to a person skilled in the art that may provide a durability to the flow tube 100.

The inlet portion 102 may comprise a plurality of flow inlets 108a-108b (hereinafter referred to as the flow inlets 108), and a first transducer housing 110 for securely holding a first transducer 112. The flow inlets 108 may be provided to enable a smooth inflow of the gas into the flow chamber 106, in a preferred embodiment of the present mechanism. Further, the flow inlets 108 may be funnel shaped inlets that may guide the gas into the flow chamber 106 such that a turbulence and a pressure loss at the flow inlets 108 is reduced and a standard deviation is minimized. The flow inlets 108 may further comprise a plurality of angled edges 114a-114b (hereinafter referred to as the angled edges 114) near a bottom end of the flow inlets 108, which may be in line with a shape of the first transducer 112 for guiding the gas into the flow chamber 106, in an embodiment of the present invention. Further, the angled edges 114 may be provided to reduce a flow cavity in front of the first transducer 112, according to an embodiment of the present invention.

Figure 2A:
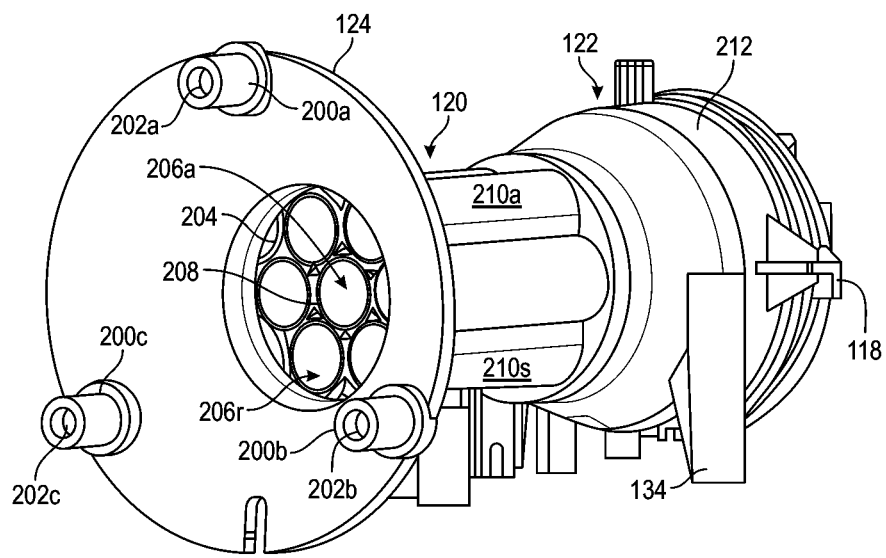
FIG. 2A is a diagram illustrating a front perspective view of the flow chamber of the flow tube.

The first transducer 112 may be a device that may be capable of converting an electrical energy into a plurality of acoustic waves (hereinafter referred to as the acoustic waves). Further, the first transducer 112 may be configured to transmit the generated acoustic waves in a form of a first acoustic wave package into the flow chamber 106. In a preferred embodiment of the present mechanism, the first transducer 112 and the second transducer 142 may have a beam angle of ±5° for directing a majority of the acoustic waves of the first acoustic wave package into a center pipe 208 of the flow chamber 106 (as shown in FIG. 2A). Furthermore, a face of the first transducer 112 pointing towards the flow chamber 106 may comprise a phase 116 that may be provided to be aligned with the angled edges 114 of the flow inlets 108 to provide the smooth flow of the gas into the flow chamber 106, in an embodiment of the present mechanism. Further, the phase 116 may align with the angled edges 114 of the flow inlets 108 to further reduce the flow cavity in front of the first transducer 112, according to an embodiment of the present invention.

Figure 1B:
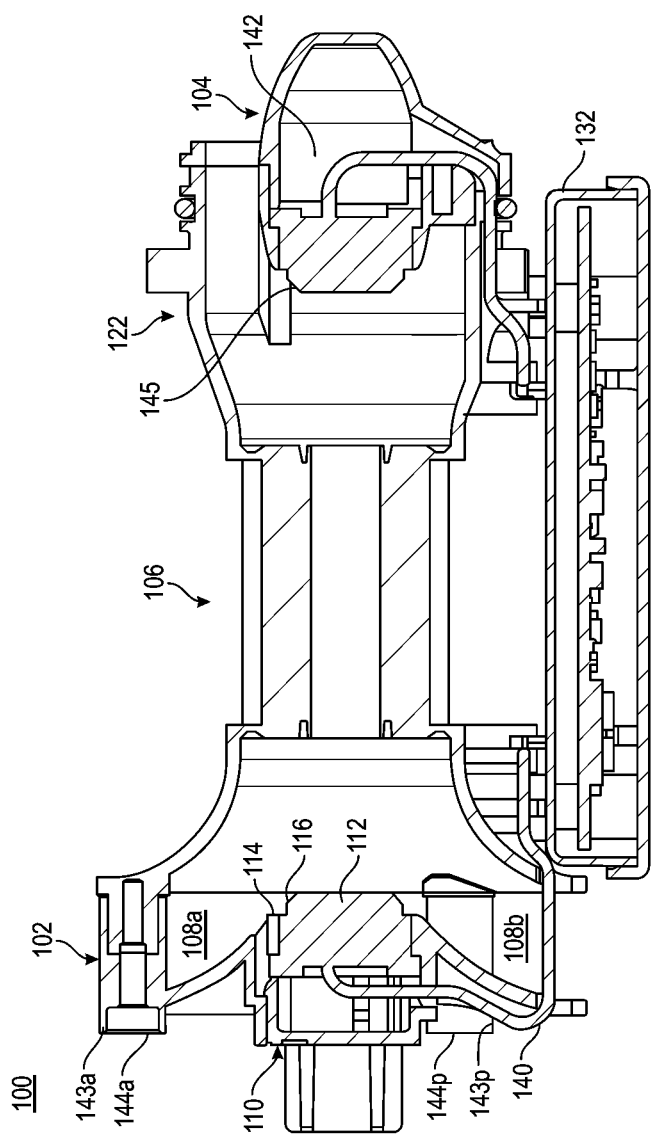
FIG. 1B is a diagram illustrating a cross-sectional view of the flow tube.

The rear housing 104 may be provided to enclose an outlet (not shown) and a second transducer 142 (as shown in FIG. 1B) of the flow tube 100. Further, the rear housing 104 may be capable of providing a smooth flow of the gas in an outward direction from the flow tube 100. In an embodiment of the present mechanism, the rear housing 104 may be fixedly attached to the flow chamber 106. In another embodiment of the present mechanism, the rear housing 104 may be removably attached to the flow chamber 106 by using a locking mechanism 118. The locking mechanism 118 may be, but not limited to, a nut and bolt locking mechanism, a cam lock, a hinge lock, a rotating bolt lock, and so forth. Embodiments of the present mechanism may include any of the locking mechanism 118 known to a person skilled in the art that may be capable of attaching the rear housing 104 with the flow chamber 106. Further, the rear housing 104 will be explained in detail in conjunction with FIG. 1D.

The flow chamber 106 may be a central chamber of the flow tube 100, which may be provided to receive the flow of the gas from the flow inlets 108. Further, the flow chamber 106 may be provided to receive the first acoustic wave package generated by the first transducer 112 and a second acoustic wave package generated by the second transducer 142. The flow chamber 106 may comprise a first end 120 and a second end 122. Further, the first end 120 of the flow chamber 106 may comprise a connector 124 having a conical shape that may be provided to attach the flow chamber 106 with the inlet portion 102. The connector 124 may comprise a plurality of locking sockets 126a-126n (hereinafter referred to as the locking sockets 126) for connecting the flow chamber 106 with the inlet portion 102 of the flow tube 100. The locking sockets 126 may be protruding outwards from the connector 124 of the flow chamber 106. Further, the locking sockets 126 may comprise a plurality of grooves 128a-128n (hereinafter referred to as the grooves 128) that may be provided to fixedly engage with the inlet portion 102 for attaching the flow chamber 106 with the inlet portion 102, in an embodiment of the present mechanism.

Further, the flow chamber 106 may comprise a wall 130 that may enclose the flow chamber 106, in an embodiment of the present mechanism. The wall 130 may be capable of reflecting a part of the acoustic waves of the first acoustic wave package and may further absorb some part of the acoustic waves of the first acoustic wave package, as the first acoustic wave package travels through the flow chamber 106. The wall 130 may be made up of a material having a high acoustic impedance that may be capable of reducing the reflection of the acoustic waves. Further, the material having the high acoustic impedance may be capable of reducing the frequency modes generated by the reflected acoustic waves of the first acoustic wave package that may take place when the first acoustic wave package from the first transducer 112 and/or the second acoustic wave package from the second transducer 142 hits the wall 130. Further, a thickness of the wall 130 may be made less than 1 Millimeter (mm) to maximize the absorption of the acoustic waves such that a minimum amount of the reflected acoustic waves of the first acoustic wave package may reach the second transducer 142. Further, the flow chamber 106 will be explained in detail in conjunction with FIG. 2A.

The flow tube 100 may further comprise a base 132 that may be attached to the flow chamber 106 through a plurality of support arms 134a-134m (hereinafter referred to as the support arms 134), in an embodiment of the present mechanism. The base 132 may be a rigid structure having a plurality of holes 136a-136o (hereinafter referred to as the holes 136) that may be provided to fixedly attach the flow tube 100 with a surface. The base 132 may be made up of a material such as, but not limited to, a Polybutylene Terephthalate (PBT), a Poly Vinyl Chloride (PVC), a metal, wood, and so forth. The base 132 may be made up of any of the material known to a person skilled in the art that may provide a durability to the base 132. The base 132 may be fixedly attached with the surface by using a plurality of fasteners 138a-138o (hereinafter referred to as the fasteners 138) that may be screwed through the holes 136 of the base 132. The fasteners 138 may be, but not limited to, a screw, an anchor bolt, and so forth. Embodiments of the present mechanism may include any of the fasteners 138 known to a person skilled in the art that may be capable of attaching the base 132 with the surface.

FIG. 1B is a diagram illustrating a cross-sectional view of the flow tube 100. The flow tube 100 may comprise the inlet portion 102, the rear housing 104, and the flow chamber 106. The inlet portion 102 may comprise the flow inlets 108, and the first transducer housing 110 for holding the first transducer 112, as discussed in the FIG. 1A. The first transducer 112 may be provided to transmit the first acoustic wave package into the flow chamber 106. Further, the first transducer 112 may have the phase 116 that may be in line with the angled edges 114 of the flow inlets 108 for providing the smooth flow of the gas into the flow chamber 106 and to reduce the flow cavity in front of the first transducer 112. The first transducer 112 may be further connected to the power supply (not shown) through a first wiring (not shown) that may be enclosed within a first wiring conduit 140. Further, the inlet portion 102 may comprise a plurality of inlet connecting cavities 143a-143p (hereinafter referred to as the inlet connecting cavities 143) that may be provided to fixedly attach the inlet portion 102 with the flow chamber 106 using a plurality of connecting tools 144a-144p (hereinafter referred to as the connecting tools 144), in an embodiment of the present mechanism. The connecting tools 144 may be, but not limited to, a threaded screw, an anchor screw, and so forth. Embodiments of the present mechanism may include any of the connecting tools 144 known to a person skilled in the art that may be capable of fixedly attaching the inlet portion 102 with the flow chamber 106.

The rear housing 104 may be provided to enclose the outlet (not shown) of the flow chamber 106, which may be provided near the second end 122 of the flow chamber 106. Further, the rear housing 104 may house the second transducer 142. The second transducer 142 may be a device that may be capable of converting an electrical energy into the acoustic waves. Further, the second transducer 142 may be provided to transmit the generated acoustic waves in a form of the second acoustic wave package into the flow chamber 106. Further, a face of the second transducer 142 pointing towards the flow chamber 106 may comprise a phase 145 for reducing a flow cavity in front of the second transducer 142 and to direct the generated second acoustic wave package into the flow chamber 106, in an embodiment of the present mechanism.

The rear housing 104 may further be capable of providing the smooth flow of the gas in the outward direction from the flow tube 100. In an embodiment of the present mechanism, the rear housing 104 may be fixedly attached to the flow chamber 106. In another embodiment of the present mechanism, the rear housing 104 may be removably attached to the flow chamber 106 using the locking mechanism 118 (as shown in the FIG. 1A). Further, the flow chamber 106 may be provided to receive the flow of the gas from the flow inlets 108. Furthermore, the flow chamber 106 may be provided to receive the first acoustic wave package generated by the first transducer 112 and the second acoustic wave package generated by the second transducer 142, as discussed above in conjunction with the FIG. 1A. The flow tube 100 may further comprise the base 132 that may be provided to fixedly attach the flow tube 100 with the surface.

Figure 1C:
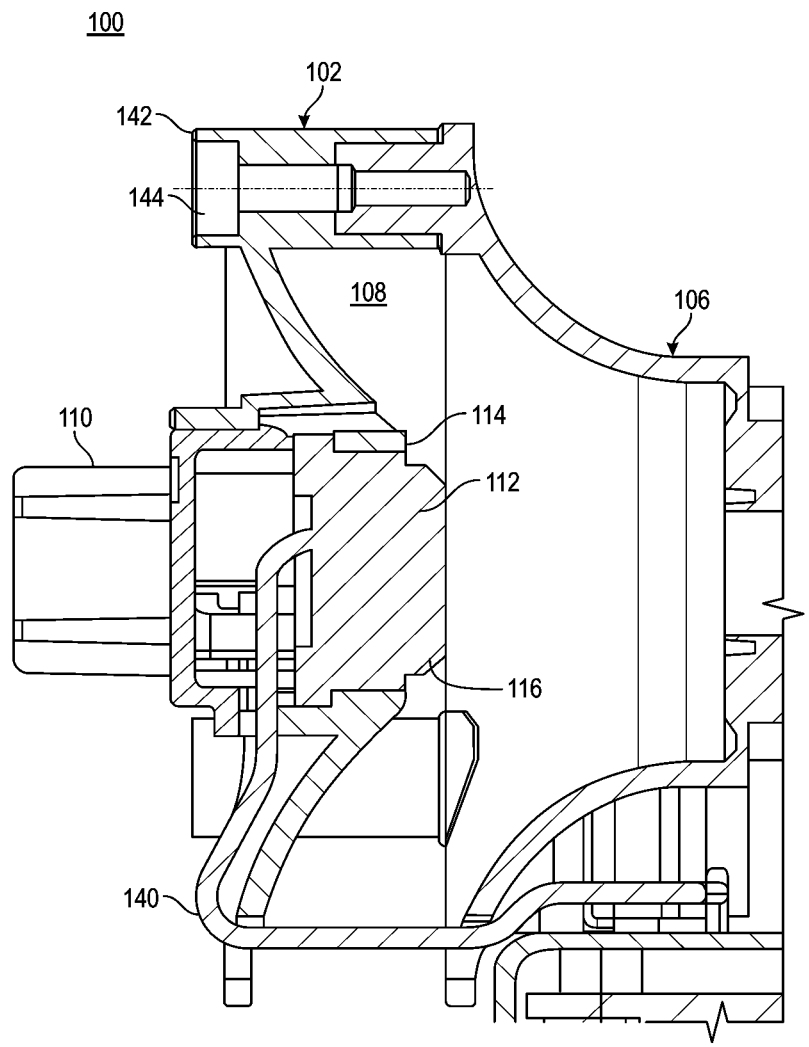
FIG. 1C is a diagram illustrating a partial cross-sectional view of the flow tube having an inlet portion attached to a flow chamber.

FIG. 1C is a diagram illustrating a partial cross-sectional view of the flow tube 100 having the inlet portion 102 attached to the flow chamber 106. The inlet portion 102 of the flow tube 100 may comprise the flow inlets 108, and the first transducer housing 110 for holding the first transducer 112. The funnel shape of the flow inlets 108 may provide the smooth flow of the gas into the flow chamber 106. Further, the flow inlets 108 may comprise the angled edges 114 near the bottom end, which may be in line with the first transducer 112 to reduce the flow cavity in front of the first transducer 112. The first transducer 112 may be provided to transmit the first acoustic wave package into the flow chamber 106. In a preferred embodiment of the present mechanism, the transducer 112 and the transducer 142 may have a narrow beam angle of ±5° for directing the majority of the acoustic waves of the first acoustic wave package into the center pipe 208 (as shown in the FIG. 2A). Furthermore, the first transducer 112 may comprise the phase 116 that may be provided to be aligned with the angled edges 114 of the flow inlets 108 to provide the smooth flow of the gas into the flow chamber 106 and to further reduce the flow cavity in front of the first transducer 112. The first transducer 112 may be further connected to the power supply (not shown) through a first wiring (not shown) that may be enclosed within the first wiring conduit 140. Further, the inlet portion 102 may comprise the inlet connecting cavities 143 that may be provided to fixedly attach the inlet portion 102 with the flow chamber 106 using the connecting tools 144, in an embodiment of the present mechanism.

Figure 1D:
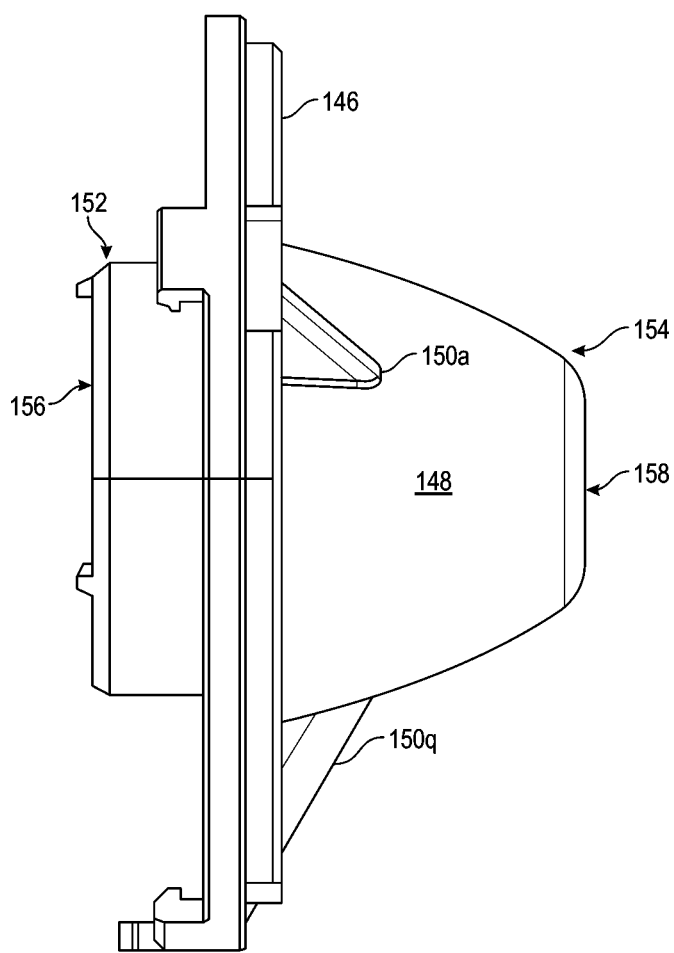
FIG. 1D is a diagram illustrating a rear housing of the flow tube.

FIG. 1D is a diagram illustrating the rear housing 104 of the flow tube 100. The rear housing 104 may be provided to enclose the outlet and the second transducer 142 (as shown in the FIG. 1B) of the flow tube 100. Further, the rear housing 104 may be capable of providing the smooth flow of the gas in the outward direction from the flow tube 100. The rear housing 104 may comprise a vertical plate 146 and a dome 148 that may be attached to one another through a plurality of support legs 150a-150q (hereinafter referred to as the support legs 150). In an embodiment of the present mechanism, the vertical plate 146 may be capable of fixedly attaching the rear housing 104 with the flow chamber 106 through the locking mechanism 118 (as shown in the FIG. 1B). The dome 148 may have a shape that may be similar to a turbine of an airplane, according to an embodiment of the present mechanism.

Further, the dome 148 may comprise a first end 152 and a second end 154. The first end 152 of the dome 148 may have an opening 156 that may be attached to the second end 122 of the flow chamber 106 such that the opening 156 completely encloses the outlet of the flow chamber 106 and the generated second acoustic wave package from the second transducer 142 may be transmitted into the flow chamber 106. The second transducer 142 may be configured to transmit the generated acoustic waves in the form of the second acoustic wave package at the beam angle of ±5° for directing a majority of the acoustic waves of the second acoustic wave package into the center pipe 208 of the flow chamber 106 (as shown in the FIG. 2A). The second end 154 of the dome 148 may have an arc shape forming a rear outlet 158 for the smooth exit of the gas from the flow tube 100.

FIG. 2A is a diagram illustrating a front perspective view of the flow chamber 106 of the flow tube 100. The flow chamber 106 may be the central chamber of the flow tube 100 that may be provided to receive the inflow of the gas from the flow inlets 108 (as shown in the FIG. 1A). Further, the flow chamber 106 may be provided to receive the first acoustic wave package generated by the first transducer 112 and the second acoustic wave package generated by the second transducer 142 (as shown in the FIG. 1B). The flow chamber 106 may comprise the first end 120 and the second end 122. The first end 120 of the flow chamber 106 may comprise the connector 124 having the conical shaped structure. Further, the connector 124 may comprise a plurality of sockets 200a-200c (hereinafter referred to as the sockets 200) protruding outwards for connecting the flow chamber 106 with the inlet portion 102 of the flow tube 100. Further, the sockets 200 may comprise a plurality of threaded grooves 202a-202c (hereinafter referred to as the threaded grooves 202) that may be provided to accept the connecting tools 144 (as shown in the FIG. 1B) for attaching the flow chamber 106 with the inlet portion 102, in an embodiment of the present mechanism. Further, a bottom end of the connector 124 may comprise an inlet wall 204 that may comprise a plurality of holes 206a-206r (hereinafter referred to as the holes 206) that may be defined in the inlet wall 204 by a first end of the center pipe 208 and a first end of a plurality of outer pipes 210a-210s (hereinafter referred to as the outer pipes 210) surrounding the center pipe 208 forming a flow channel, in an embodiment of the present mechanism. The flow channel formed by the center pipe 208 and the outer pipes 210 may be capable of propagating the gas in an upstream direction from the first transducer 112 to the second transducer 142, and in a downstream direction from the second transducer 142 to the first transducer 112. In another embodiment of the present mechanism, the outer pipes 210 may be further surrounded by another layer of pipes (not shown) forming a honeycomb shaped flow channel. In yet another embodiment of the present mechanism, the outer pipes 210 may be arranged around the center pipe 208 forming a rectangular flow channel. In a preferred embodiment of the present mechanism, a number of the outer pipes 210 that may surround the center pipe 208 may be six. In another embodiment of the present mechanism, the number of the outer pipes 210 that may surround the center pipe 208 may be in a range of 1 to 50. In yet another embodiment of the present mechanism, the number of the outer pipes 210 that may be surrounding the center pipe 208 may be selected such that a velocity of the gas and a flow rate of the gas propagating through the center pipe 208 and the outer pipes 210 may be numerically same. In yet another embodiment of the present mechanism, a number of layers of the pipes that may be surrounding the center pipe 208 and the outer pipes 210 may be selected such that the velocity of the gas and the flow rate of the gas propagating through the center pipe 208 and the outer pipes 210 may be numerically same. Further, a thickness of a wall of the center pipe 208 and a thickness of a wall of the outer pipes 210 may be less than 1 Millimeter (mm), in an embodiment of the present mechanism.

Further, the first transducer 112 may be configured to transmit the acoustic waves of the first acoustic wave package that may be directed into the center pipe 208 at the beam angle of ±5°. The center pipe 208 may receive the majority of the acoustic waves of the first acoustic wave package and the outer pipes 210 may receive a minority of the acoustic waves of the acoustic wave package from the first transducer 112. Further, the acoustic wave package transmitted from the first transducer 112 may propagate through the centre pipe 208 and may be received at the second transducer 142. Further, the upstream time of flight of the propagation of the first acoustic wave package from the first transducer 112 to the second transducer 142 may be calculated and stored.

Furthermore, the acoustic waves of the second acoustic wave package transmitted from the second transducer 142 may be directed into the center pipe 208 at the beam angle of ±5°. The center pipe 208 may receive the majority of the acoustic waves of the second acoustic wave package and the outer pipes 210 may receive a minority of the acoustic waves of the second acoustic wave package from the second transducer 142. The second acoustic wave package may propagate through the centre pipe 208 and may be received at the first transducer 112. The downstream time of flight of the propagation of the second acoustic wave package from the second transducer 142 to the first transducer 112 may be calculated and stored. Further, a delta time of flight between the upstream time of flight and the downstream time of flight may be determined. Furthermore, the flowrate or the velocity may be determined as a function of the upstream time of flight, the downstream time of flight and the delta time of flight. The determined flow rate may be interpolated with a constant to determine a total flow rate of the gas through the flow tube 100. A value of the constant may be equal to a numerical value calculated by summing a number of the centre pipe 208 and a number of the outer pipes 210 surrounding the centre pipe 208, according to an embodiment of the present mechanism.

Further, the second end 122 of the flow chamber 106 may comprise a rear connector 212 having a conical shaped structure. The rear connector 212 may comprise an opening for receiving the vertical plate 146 of the rear housing 104 (as shown in the FIG. 1D), in an embodiment of the present mechanism. Further, the rear connector 212 may comprise an outlet wall (not shown) that may be connected to a second end of the centre pipe 208 and a second end of the outer pipes 210. Further, the outlet wall may comprise a plurality of absorbing structures (not shown). The absorbing structures may be provided on an outer surface of the outlet wall such that the absorbing structures may face the second transducer 142 housed in the rear housing 104 (as shown in the FIG. 1B). Further, the absorbing structures may be arranged in any direction that may be different from a direction of the outer surface of the outlet wall such that the second acoustic wave package transmitted from the second transducer 142 may get absorbed in the absorbing structures and the reflected acoustic waves of the second acoustic wave package from the outlet wall towards the second transducer 142 may be minimum. According to embodiments of the present mechanism, the absorbing structures may be, but not limited to, a cavity, an elevated geometry, and so forth. Embodiments of the present invention are intended to include or otherwise cover any of the absorbing structures that may absorb the acoustic waves.

Further, the flow chamber 106 may comprise the locking mechanism 118 that may be disposed on an outer surface of the rear connector 212 for connecting the flow chamber 106 with the rear housing 104 of the flow tube 100 (as shown in the FIG. 1A). The locking mechanism 118 may be a screw type locking mechanism that may be rotated in a clockwise direction for tightening the flow chamber 106 onto the rear housing 104, in an embodiment of the present mechanism. In another embodiment of the present mechanism, the locking mechanism 118 may be rotated in an anti-clockwise direction for loosening the flow chamber 106 onto the rear housing 104. Further, the flow chamber 106 may comprise the support arms 134 extending vertically downwards from the flow chamber 106. The support arms 134 may be provided to attach the flow chamber 106 with the base 132 (as shown in the FIG. 1A), in an embodiment of the present mechanism.

Figure 2B:
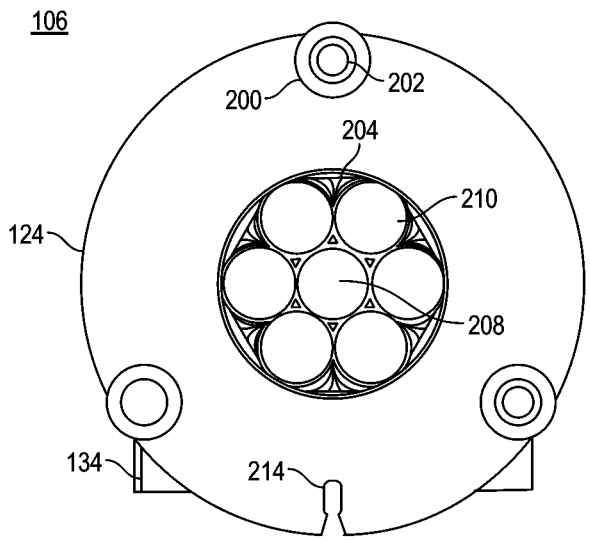
FIG. 2B is a diagram illustrating a front view of the flow chamber.

FIG. 2B is a diagram illustrating a front view of the flow chamber 106. The flow chamber 106 may comprise the connector 124 having the sockets 200 protruding outwards for connecting the flow chamber 106 with the inlet portion 102 of the flow tube 100 (as shown in the FIG. 1C). Further, the sockets 200 may comprise the threaded grooves 202 that may be provided to accept the connecting tools 144 (as shown in the FIG. 1B) for attaching the flow chamber 106 with the inlet portion 102, in an embodiment of the present mechanism. Further, the inlet wall 204 of the flow chamber 106 may be attached to the first end of the center pipe 208 and the first end of the outer pipes 210, in an embodiment of the present mechanism. The thickness of the wall of the center pipe 208 and the thickness of the wall of the outer pipes 210 may be less than 1 Millimeter (mm), in an embodiment of the present mechanism. Further, the connector 124 of the flow chamber 106 comprises a notch 214 that may be provided to be engaged with the inlet portion 102 of the flow tube 100, in an embodiment of the present mechanism.

Figure 2C:
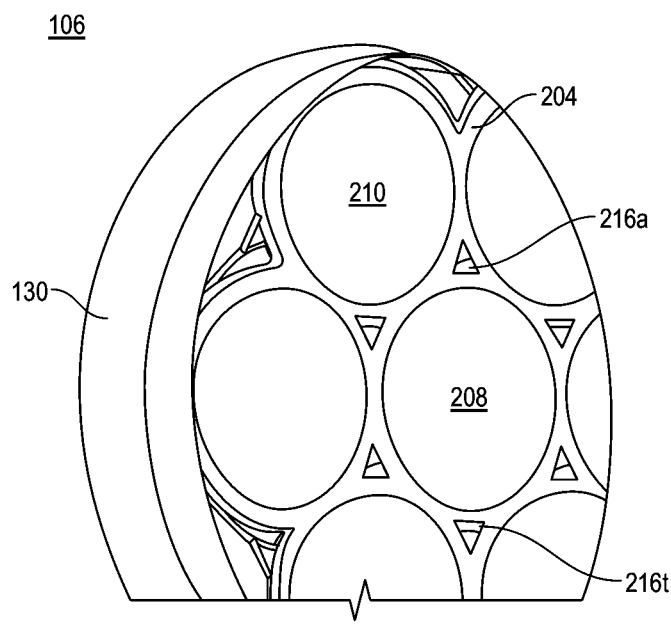
FIG. 2C is a diagram illustrating an enlarged front perspective view of the flow chamber.

FIG. 2C is a diagram illustrating an enlarged front perspective view of the inlet wall 204 of the flow chamber 106. The inlet wall 204 may be attached to the first end of the center pipe 208 and the first end of the outer pipes 210, in an embodiment of the present mechanism. In a preferred embodiment of the present mechanism, the number of the outer pipes 210 that may be surrounding the center pipe 208 may be six. In another embodiment of the present mechanism, the number of the outer pipes 210 that may be surrounding the center pipe 208 may be selected such that the velocity of the gas and the flow rate of the gas propagating through the center pipe 208 and the outer pipes 210 may be numerically same. The center pipe 208 and the outer pipes 210 may be enclosed within the wall 130 having the thickness of 1 Millimeter (mm). Further, the inlet wall 204 may comprise a plurality of absorbing structures 216a-216t (hereinafter referred to as the absorbing structures 216). The absorbing structures 216 may be provided on an outer surface of the inlet wall 204 such that the absorbing structures 216 faces the first transducer 112 housed in the first transducer housing 210. Further, the absorbing structures 216 may be arranged in any direction that may be different from a direction of the outer surface of the inlet wall 204 such that the acoustic wave package transmitted from the first transducer 112 may get absorbed in the absorbing structures 216 and the reflected acoustic waves of the first acoustic wave package from the inlet wall 204 towards the first transducer 112 may be minimum. According to embodiments of the present mechanism, the absorbing structures may be, but not limited to, a cavity, an elevated geometry, and so forth. Embodiments of the present invention are intended to include or otherwise cover any of the absorbing structures that may absorb the acoustic waves.

Figure 3:
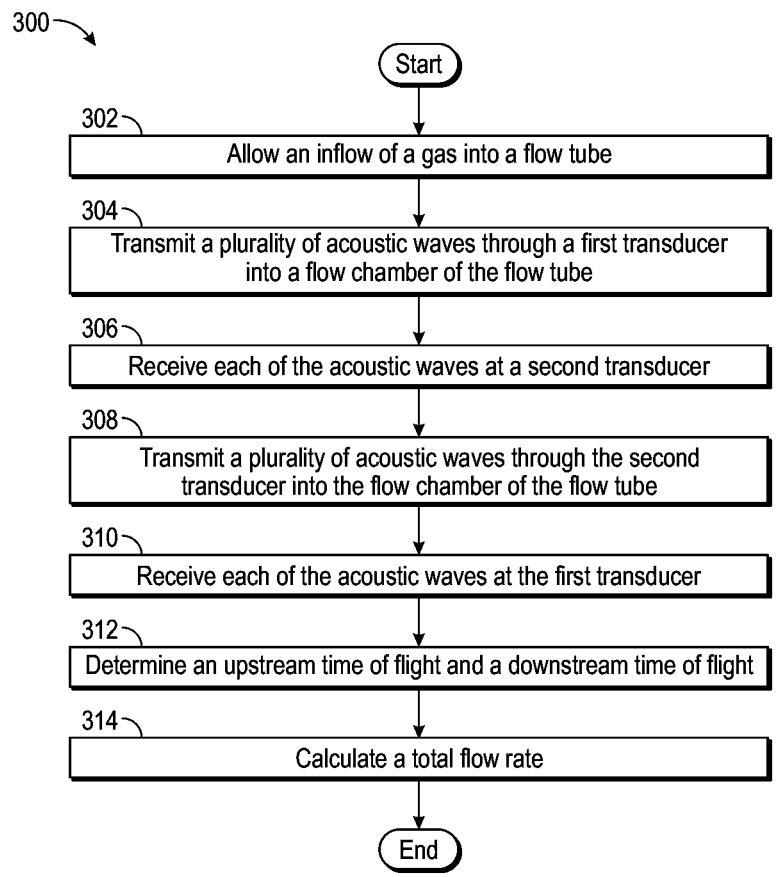
FIG. 3 illustrates a flowchart of a method for measuring a total flow rate using the flow tube.

FIG. 3 illustrates a flowchart of a method for measuring the total flow rate using the flow tube 100.

At step 302, the inflow of the gas into the flow tube 100 may be allowed through the flow inlets 108 of the inlet portion 102 such that the flow of the gas is directed equally into the center pipe 208 and the outer pipes 210.

At step 304, the first acoustic wave package generated by the first transducer 112 may be transmitted into the flow chamber 106 such that the majority of the acoustic waves of the first acoustic wave package are directed into the center pipe 208.

At step 306, the first acoustic wave package may propagate through the flow chamber 106 and may be received at the second transducer 142.

At step 308, the second acoustic wave package generated by the second transducer 142 may be transmitted into the flow chamber 106 such that the majority of the acoustic waves of the second acoustic wave package are directed into the center pipe 208.

At step 310, the second acoustic wave package may propagate through the flow chamber 106 and may be received at the first transducer 112.

At step 312, an upstream time of flight of the propagation of the first acoustic wave package from the first transducer 112 to the second transducer 142 may be determined and a downstream time of flight of the propagation of the second acoustic wave package from the second transducer 142 to the first transducer 112 may be determined. Further, the delta time of flight between the upstream time of flight and the downstream time of flight may be determined. The upstream time of flight, the downstream time of flight and the delta time of flight may be used to calculate the velocity of the gas travelling through the center pipe 208. Further, the flow rate of the gas in the center pipe 208 may be calculated by using the determined velocity.

At step 314, the total flow rate of the gas may be calculated by interpolating the determined flow rate in the center pipe 208 by multiplying the determined flow rate with a constant having a value equal to a numerical value calculated by summing a number of the centre pipe 208 and a number of the outer pipes 210 surrounding the centre pipe 208.

Any publication or patent document that may be noted herein is hereby incorporated by reference to the same extent as if each individual publication, or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An ultrasonic flow tube comprising:
a flow chamber for accepting an inflow of a gas, wherein the flow chamber comprises a center pipe and a plurality of outer pipes surrounding the center pipe, connected between an inlet wall provided at a first end of the flow chamber and an outlet wall provided at a second end of the flow chamber such that a velocity of the gas within the center pipe and each of the plurality of outer pipes is numerically the same; and
a first transducer attached near the inlet wall and a second transducer attached near the outlet wall, wherein a first acoustic wave package generated by the first transducer and a second acoustic wave package generated by the second transducer are transmitted into the flow chamber such that the center pipe receives a majority of the first acoustic wave package and the second acoustic wave package, and each of the plurality of outer pipes receives a minority of the first acoustic wave package and the second acoustic wave package;
wherein an outer surface of the inlet wall and an outer surface of the outlet wall comprises a plurality of absorbing structures for absorbing a plurality of acoustic waves of the first acoustic wave package and the second acoustic wave package.

2. The ultrasonic flow tube of claim 1, further comprising one or more flow inlets to enable a smooth inflow of the gas inside the flow chamber, wherein each of the one or more flow inlets is having a funnel shape.

3. The ultrasonic flow tube of claim 1, wherein the plurality of absorbing structures is selected from one of, a cavity, an elevated geometry, or a combination thereof.

4. The ultrasonic flow tube of claim 1, further comprising a rear housing attached to the second end of the flow chamber, wherein the rear housing comprises a dome to provide a smooth flow of the gas in an outward direction from the ultrasonic flow tube.

5. The ultrasonic flow tube of claim 1, wherein the first acoustic wave package and the second acoustic wave package are directed into the flow chamber at a narrow beam angle.

6. The ultrasonic flow tube of claim 1, wherein the center pipe and each of the plurality of outer pipes are made up of a material having a high acoustic impedance and a wall thickness of less than 1 Millimeter (mm).

7. The ultrasonic flow tube of claim 1, wherein each of the one or more flow inlets comprises one or more angled edges near a bottom end to reduce a flow cavity in front of the first transducer.

8. The ultrasonic flow tube of claim 7, wherein the first transducer comprises a phase to be aligned with the one or more angled edges of each of the one or more flow inlets to further reduce the flow cavity in front of the first transducer.

9. The ultrasonic flow tube of claim 1, wherein the second transducer comprises a phase to reduce a flow cavity in front of the second transducer for directing the second acoustic wave package into the flow chamber.

10. The ultrasonic flow tube of claim 1, wherein a shape of a flow channel formed by the center pipe and each of the plurality of outer pipes is selected from one of, a circular, a rectangular, a honeycomb, or a polygon.

11. An ultrasonic flow tube comprising:
one or more flow inlets to enable a smooth inflow of a gas inside the ultrasonic flow tube, wherein each of the one or more flow inlets is having a funnel shape;
a flow chamber for accepting the inflow of the gas, wherein the flow chamber comprises a center pipe and a plurality of outer pipes surrounding the center pipe, connected between an inlet wall provided at a first end of the flow chamber and an outlet wall provided at a second end of the flow chamber such that a velocity of the gas within the center pipe and each of the plurality of outer pipes is numerically the same; and
a first transducer attached near the inlet wall and a second transducer attached near the outlet wall, wherein a first acoustic wave package generated by the first transducer and a second acoustic wave package generated by the second transducer are transmitted into the flow chamber at a narrow beam angle such that the center pipe receives a majority of the first acoustic wave package and the second acoustic wave package, and each of the plurality of outer pipes receives a minority of the first acoustic wave package and the second acoustic wave package;
wherein an outer surface of the inlet wall and an outer surface of the outlet wall comprises a plurality of absorbing structures for absorbing a plurality of acoustic waves of the first acoustic wave package and the second acoustic wave package.

12. The ultrasonic flow tube of claim 11, wherein the plurality of absorbing structures is selected from one of, a cavity, an elevated geometry, or a combination thereof.

13. The ultrasonic flow tube of claim 11, further comprising a rear housing attached to the second end of the flow chamber, wherein the rear housing comprises a dome to provide a smooth flow of the gas in an outward direction from the ultrasonic flow tube.

14. The ultrasonic flow tube of claim 11, wherein the center pipe and each of the plurality of outer pipes are made up of a material having a high acoustic impedance and a wall thickness of less than 1 Millimeter (mm).

15. The ultrasonic flow tube of claim 11, wherein each of the one or more flow inlets comprises one or more angled edges near a bottom end to reduce a flow cavity in front of the first transducer.

16. The ultrasonic flow tube of claim 15, wherein the first transducer comprises a phase to be aligned with the one or more angled edges of each of the one or more flow inlets to further reduce the flow cavity in front of the first transducer.

17. The ultrasonic flow tube of claim 11, wherein the second transducer comprises a phase to reduce a flow cavity in front of the second transducer for directing the second acoustic wave package into the flow chamber.

18. A method for measuring a total flow rate using an ultrasonic flow tube, the method comprising steps of:
allowing a smooth inflow of a gas into a flow chamber of the ultrasonic flow tube through one or more of funnel shaped flow inlets;
transmitting a first acoustic wave package using a first transducer, directed towards a center pipe of the flow chamber surrounded by a plurality of outer pipes such that the first acoustic wave package is directed at a narrow beam angle;

receiving the first acoustic wave package from the center pipe of the flow chamber at a second transducer;

transmitting a second acoustic wave package using the second transducer, directed towards the center pipe of the flow chamber at a narrow beam angle;

receiving the second acoustic wave package from the center pipe of the flow chamber at the first transducer;

determining an upstream time of flight of propagation of the first acoustic wave package from the first transducer to the second transducer, and a downstream time of flight of propagation of the second acoustic wave package from the second transducer to the first transducer;

calculating a flow rate of the gas inside the center pipe of the flow chamber based on the determined upstream time of flight, the determined downstream time of flight and the delta time of flight between both; and calculating the total flow rate by interpolating the calculated flow rate of the center pipe according to a numerical value calculated by summing a number of the center pipe and a number of the outer pipes surrounding the center pipe; and having outer surfaces of an inlet and an outlet wall comprising a plurality of absorbing structures, absorbing a plurality of acoustic waves of the first acoustic wave package and the second acoustic wave package.

19. The method of claim 18, further comprising a step of aligning a phase of the first transducer with one or more angled edges of each of the one or more flow inlets.

\* \* \* \* \*